(12) United States Patent
Lin

(10) Patent No.: US 11,695,316 B2
(45) Date of Patent: Jul. 4, 2023

(54) ELECTRIC MAGNETIC RESISTANCE CONTROL STRUCTURE FOR EXERCISE MACHINE

(71) Applicant: Tsung-Chou Lin, Tainan (TW)

(72) Inventor: Tsung-Chou Lin, Tainan (TW)

( * ) Notice: Subject to any disclaimer, the term of this patent is extended or adjusted under 35 U.S.C. 154(b) by 320 days.

(21) Appl. No.: 17/077,377

(22) Filed: Oct. 22, 2020

(65) Prior Publication Data

US 2022/0131454 A1  Apr. 28, 2022

(51) Int. Cl.
*H02K 7/02* (2006.01)
*H02K 49/04* (2006.01)
*A63B 21/005* (2006.01)
*A63B 24/00* (2006.01)
*A63B 21/22* (2006.01)
*A63B 22/06* (2006.01)

(52) U.S. Cl.
CPC ....... *H02K 49/046* (2013.01); *A63B 21/0052* (2013.01); *A63B 21/225* (2013.01); *A63B 24/0087* (2013.01); *H02K 7/02* (2013.01); *A63B 2022/0611* (2013.01)

(58) Field of Classification Search
CPC ....... A63B 21/00; A63B 21/005; A63B 21/06; A63B 21/22; A63B 21/225; A63B 22/0006; H02K 7/00; H02K 7/02; H02K 49/00; H02K 49/04; H02K 49/046
See application file for complete search history.

(56) References Cited

U.S. PATENT DOCUMENTS

2022/0096888 A1*  3/2022  Hsu ................ A63B 21/0051

FOREIGN PATENT DOCUMENTS

| CN | 2017044113 | * | 2/2011 |
| TW | 556569 | | 10/2003 |

* cited by examiner

*Primary Examiner* — Tran N Nguyen
(74) *Attorney, Agent, or Firm* — Rosenberg, Klein & Lee

(57) ABSTRACT

An electric magnetic resistance control structure for an exercise machine includes a base; a flywheel, pivotally connected to the base through a rotating shaft, the rotating shaft defining an axial direction, the flywheel, a non-magnetically sensitive layer being coupled to a circumference of the flywheel; a power unit, fixed to the base; a magnetic resistance unit, including a coupling portion corresponding to an arc of the non-magnetically sensitive layer, at least one magnetic member being provided on the coupling portion and kept at a distance from the non-magnetically sensitive layer to generate a magnetic resistance effect; a control unit, configured to control a current applied to the power unit to drive the magnetic resistance unit to move along the axial direction, thereby changing an overlapping area of the magnetic member and the non-magnetically sensitive layer in the axial direction, so as to adjust a magnetic resistance of the flywheel.

8 Claims, 12 Drawing Sheets

F I G . 10
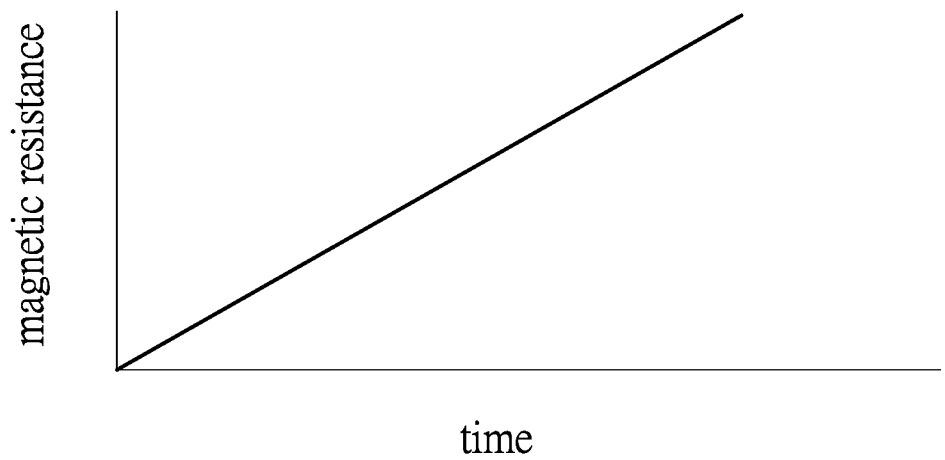
F I G . 11

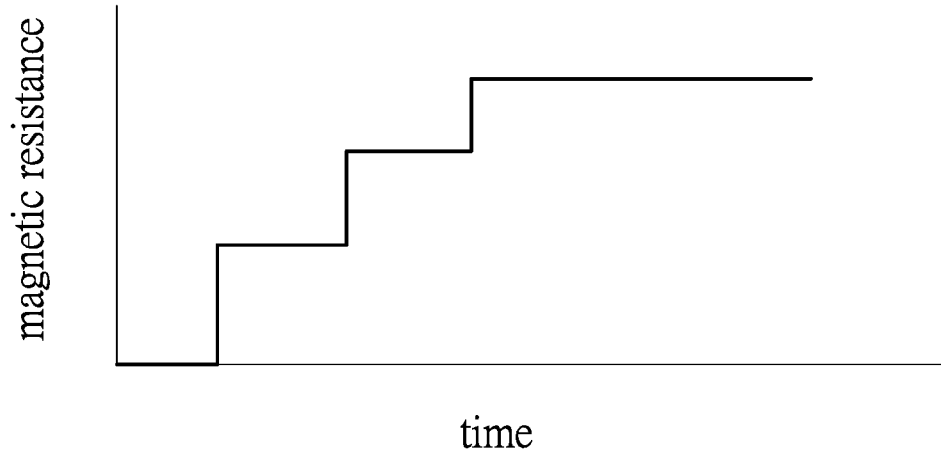
F I G . 12
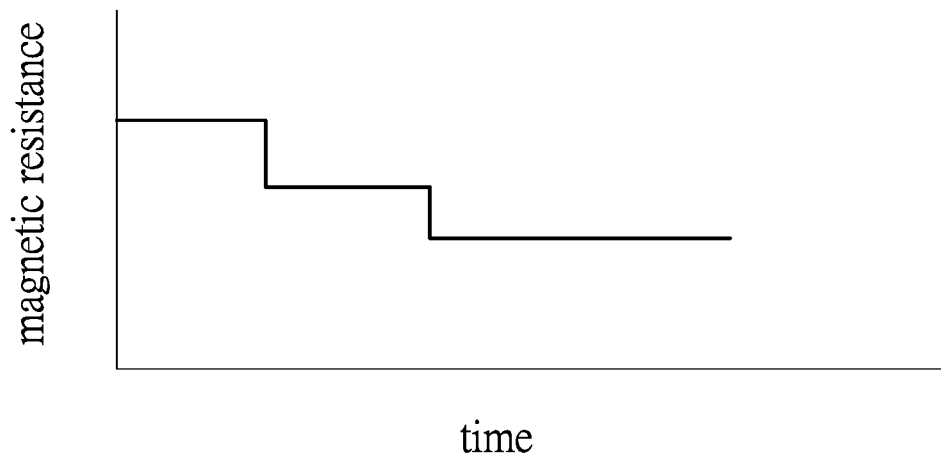
F I G . 13

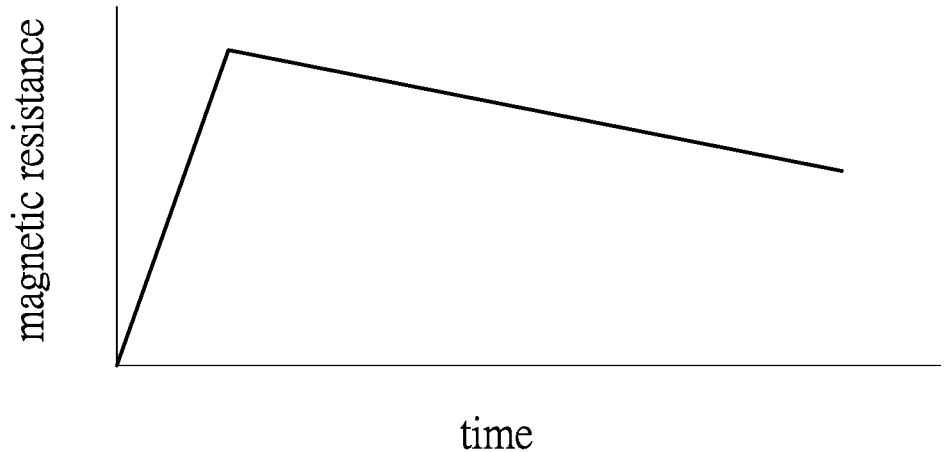
F I G . 14
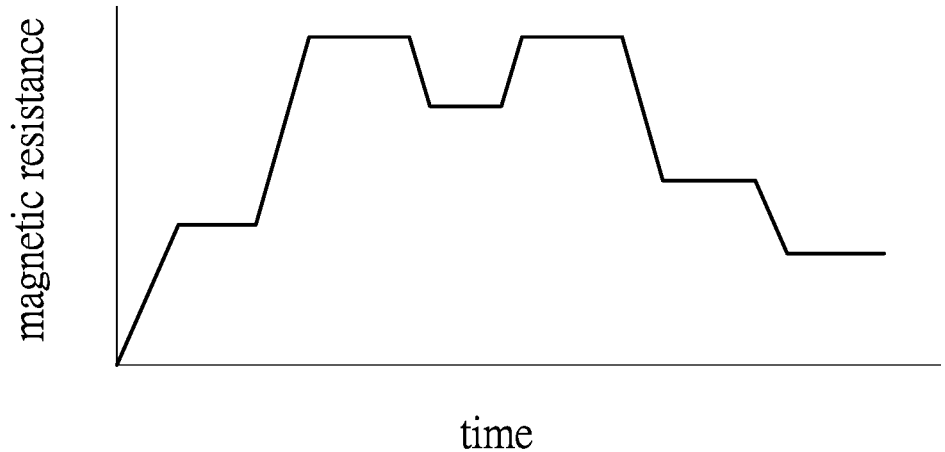
F I G . 15

ELECTRIC MAGNETIC RESISTANCE CONTROL STRUCTURE FOR EXERCISE MACHINE

FIELD OF THE INVENTION

The present invention relates to a magnetic resistance control structure for an exercise machine that can avoid loss in the process of generating the magnetic force by the electric current.

BACKGROUND OF THE INVENTION

Taiwan Utility Model Publication No. 556569 published on Oct. 1, 2003 discloses an electromagnetic resistance structure of an exercise machine, comprising a fixed frame fixed on the exercise machine, a flywheel pivoted to the fixed frame, a magnetic resistance brake ring fixed to the periphery of the flywheel, and a magnetic body fixed in the fixed frame and corresponding to the radial direction of the flywheel. The magnetic body includes a magnetic pole magnetic circuit. The magnetic pole magnetic circuit includes at least two magnetic poles. Each magnetic pole is wound with a multi-turn exciting coil. The winding direction of the multi-turn exciting coil is the same. The multi-turn exciting coil is energized to generate a magnetic field for acting on the magnetic resistance brake ring and the flywheel. The controller installed on the exercise machine controls the voltage and current and the output magnetomotive force to control the magnetic flux on the magnetic circuit, so that the resistance load on the exercise machine has a larger adjustment range.

In the aforementioned patent, the electric current generates a magnetic force, and the magnetic force forms a magnetic resistance to the flywheel. But, because the material of the exciting coil has resistance, there will be losses in the process of generating the magnetic force by the electric current.

SUMMARY OF THE INVENTION

The primary object of the present invention is to solve the above-mentioned shortcomings in the magnetic resistance control of the conventional exercise machine. The present invention provides an electric magnetic resistance control structure for an exercise machine. The electric magnetic resistance control structure comprises a base, a flywheel, a power unit, a magnetic resistance unit, and a control unit. The flywheel is pivotally connected to the base through a rotating shaft. The rotating shaft defines an axial direction. The flywheel rotates about the rotating shaft. The flywheel is made of a magnetically sensitive material. A non-magnetically sensitive layer is coupled to a circumference of the flywheel. The power unit is fixed to the base. The magnetic resistance unit is driven by the power unit to move along the axial direction. The magnetic resistance unit includes a coupling portion corresponding to an arc of the non-magnetically sensitive layer. At least one magnetic member is provided on the coupling portion. The magnetic member is kept at a distance from the non-magnetically sensitive layer to generate a magnetic resistance effect. The control unit is electrically connected to the power unit, so as to control the power unit to actuate. A current is applied to the power unit to drive the magnetic resistance unit to move along the axial direction. An overlapping area of the magnetic member and the non-magnetically sensitive layer in the axial direction is changeable, so as to adjust a magnetic resistance of the flywheel.

Preferably, the base includes a first plate and a second plate. The first plate and the second plate are arranged oppositely and fixedly connected by a plurality of supporting rods.

Preferably, the second plate has an arc-shaped through hole. The coupling portion has a cross-section corresponding in shape to the arc-shaped through hole so that the coupling portion can pass through the through hole.

Preferably, the power unit includes a rotatable lead screw extending along the axial direction. The magnetic resistance unit includes a moving seat and two sliding blocks. The lead screw is threadedly inserted through the moving seat. The supporting rods are inserted through the two sliding blocks.

Preferably, the power unit is an electric motor configured to drive the lead screw to rotate.

Preferably, the lead screw straddles the non-magnetically sensitive layer.

Preferably, the control unit outputs a control command to the power unit for controlling a rotation speed, forward or reverse rotation of the lead screw.

Preferably, the first plate has a hollow fixing portion. The power unit is fixed to the fixing portion by a fixing seat.

Preferably, one end of the rotating shaft is connected to a transmission member.

Preferably, the flywheel is made of cast iron. The non-magnetically sensitive layer is made of aluminum. The magnetic member is a permanent magnet.

The above technical features have the following advantages:

1. By rotating the lead screw of the power unit, the overlapping area of the magnetic member and the non-magnetically sensitive layer can be changed, thereby adjusting the magnetic resistance of the flywheel.

2. In the present invention, only a small current is applied to the power unit to actuate the magnetic resistance unit, so as to control and change the magnetic resistance by means of various magnetic resistance modes. As to the magnetic resistance unit of the conventional exercise machine, it is necessary to use current to generate a magnetic force through the excitation coil to change the magnetic resistance. Therefore, in the present invention, there will be no loss in the process of generating the magnetic force by the electric current.

3. The magnetic resistance of the present invention is controlled by the control unit through the power unit. The control unit has a variety of built-in control modes. Each control mode has a predetermined control command. The control command can change with the time of operation. In use, the user can select a desired magnetic resistance mode for exercise training.

4. Through the built-in control commands of the control unit, the magnetic resistance can be automatically changed. In the training process, there is no need for the user to adjust the magnetic resistance manually so that he/she can focus more on training.

BRIEF DESCRIPTION OF THE DRAWINGS

FIG. 10 illustrates the relationship between the time and the magnetic resistance according to the embodiment of the present invention, showing one of the magnetic resistance modes, namely, a constant magnetic resistance mode;

FIG. 11 illustrates the relationship between the time and the magnetic resistance according to the embodiment of the present invention, showing one of the magnetic resistance modes, namely, a stepless gradually increasing magnetic resistance mode;

FIG. 12 illustrates the relationship between the time and the magnetic resistance according to the embodiment of the present invention, showing one of the magnetic resistance modes, namely, a multi-stage gradually increasing magnetic resistance mode;

FIG. 13 illustrates the relationship between the time and the magnetic resistance according to the embodiment of the present invention, showing one of the magnetic resistance modes, namely, a multi-stage gradually decreasing magnetic resistance mode;

FIG. 14 illustrates the relationship between the time and the magnetic resistance according to the embodiment of the present invention, showing one of the magnetic resistance modes, from a stepless gradually increasing magnetic resistance mode to a stepless gradually decreasing magnetic resistance mode; and FIG. 15 illustrates the relationship between the time and the magnetic resistance according to the embodiment of the present invention, showing one of the magnetic resistance modes, namely, a multi-stage hybrid mode.

DESCRIPTION OF THE PREFERRED EMBODIMENTS

Embodiments of the present invention will now be described, by way of example only, with reference to the accompanying drawings.

Figure 1:
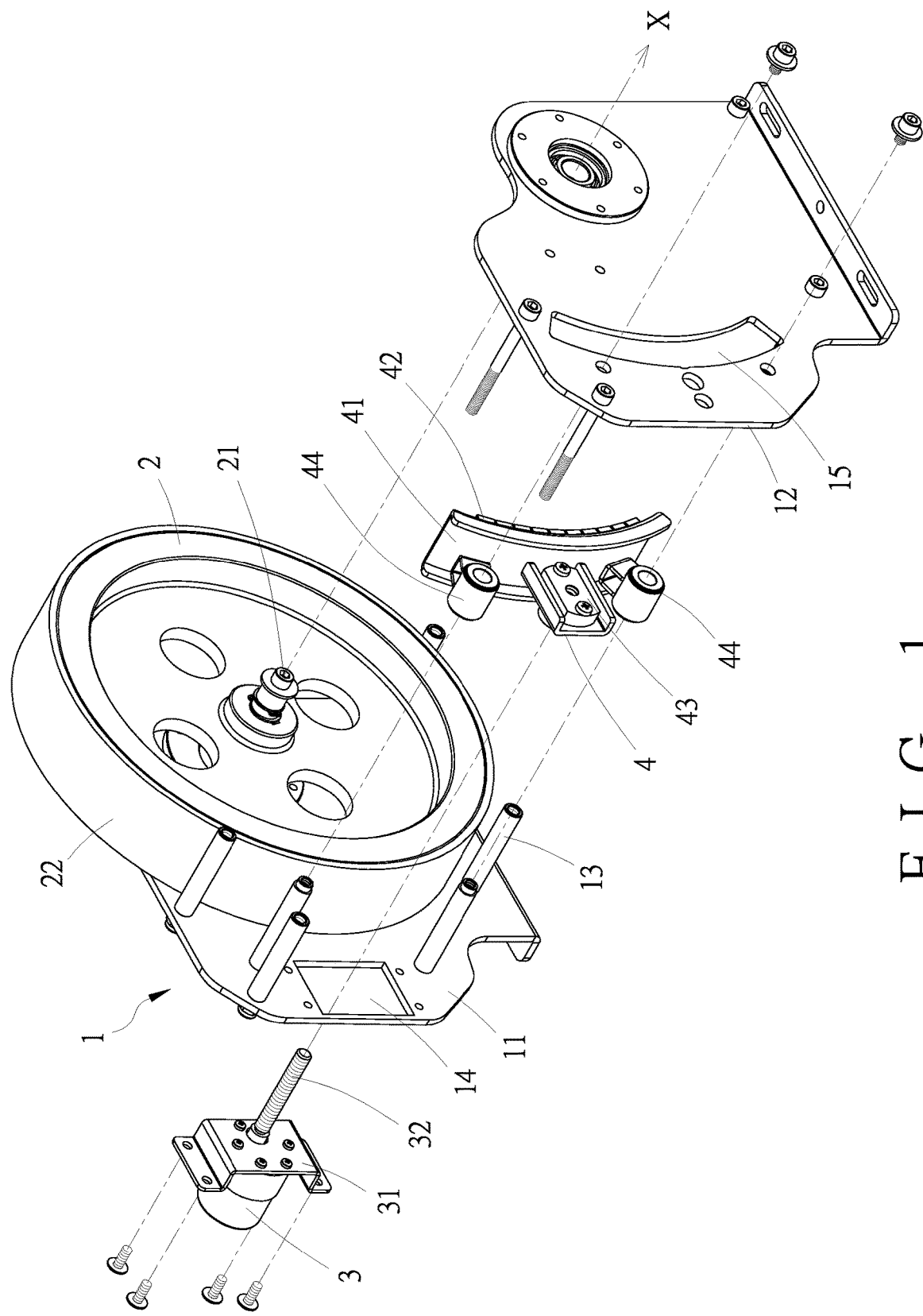
FIG. 1 is an exploded view according to an embodiment of the present invention.
Figure 2:
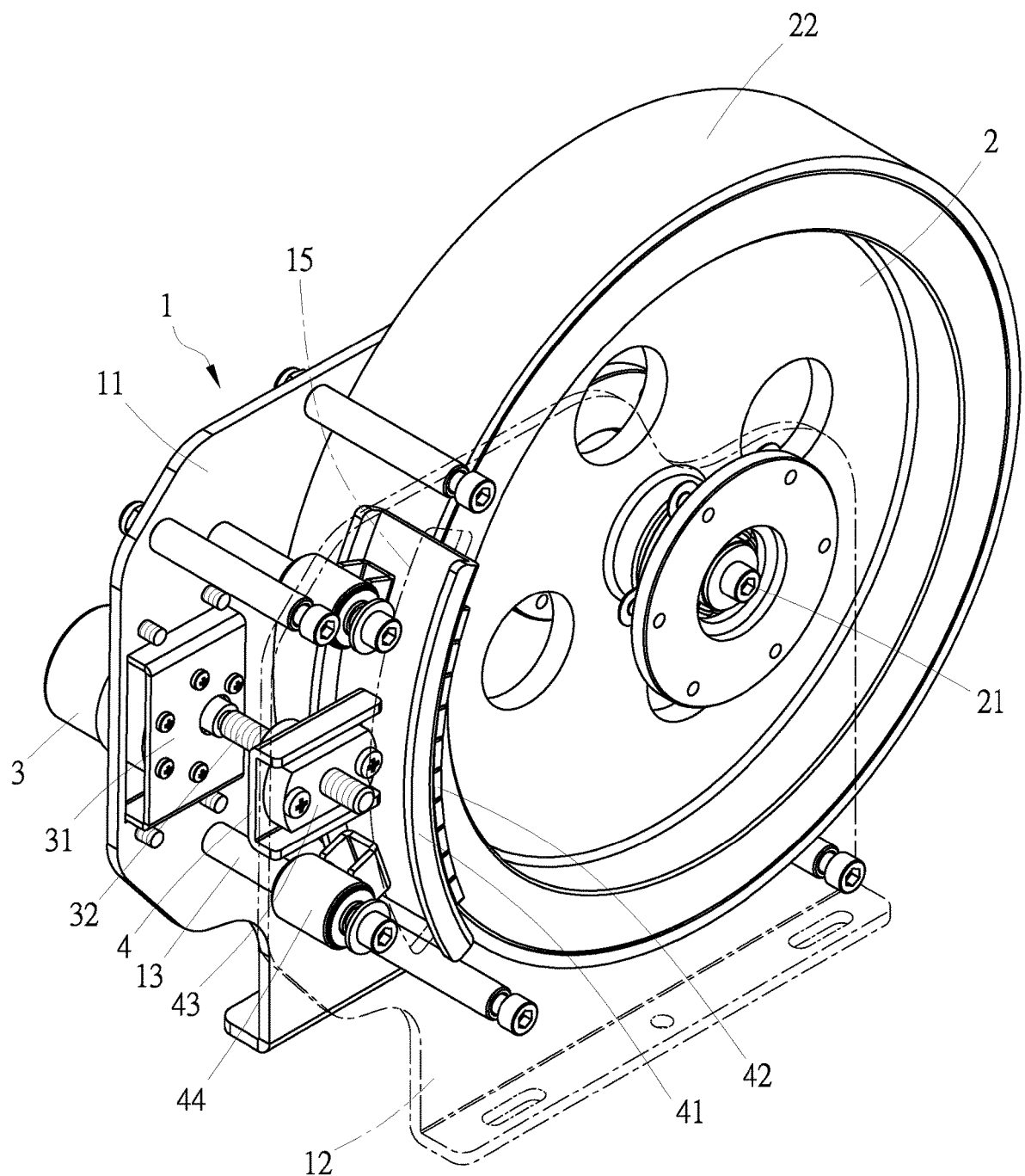
FIG. 2 is a perspective view according to the embodiment of the present invention, showing the relative position between the magnetic resistance unit and the flywheel.
Figure 3:
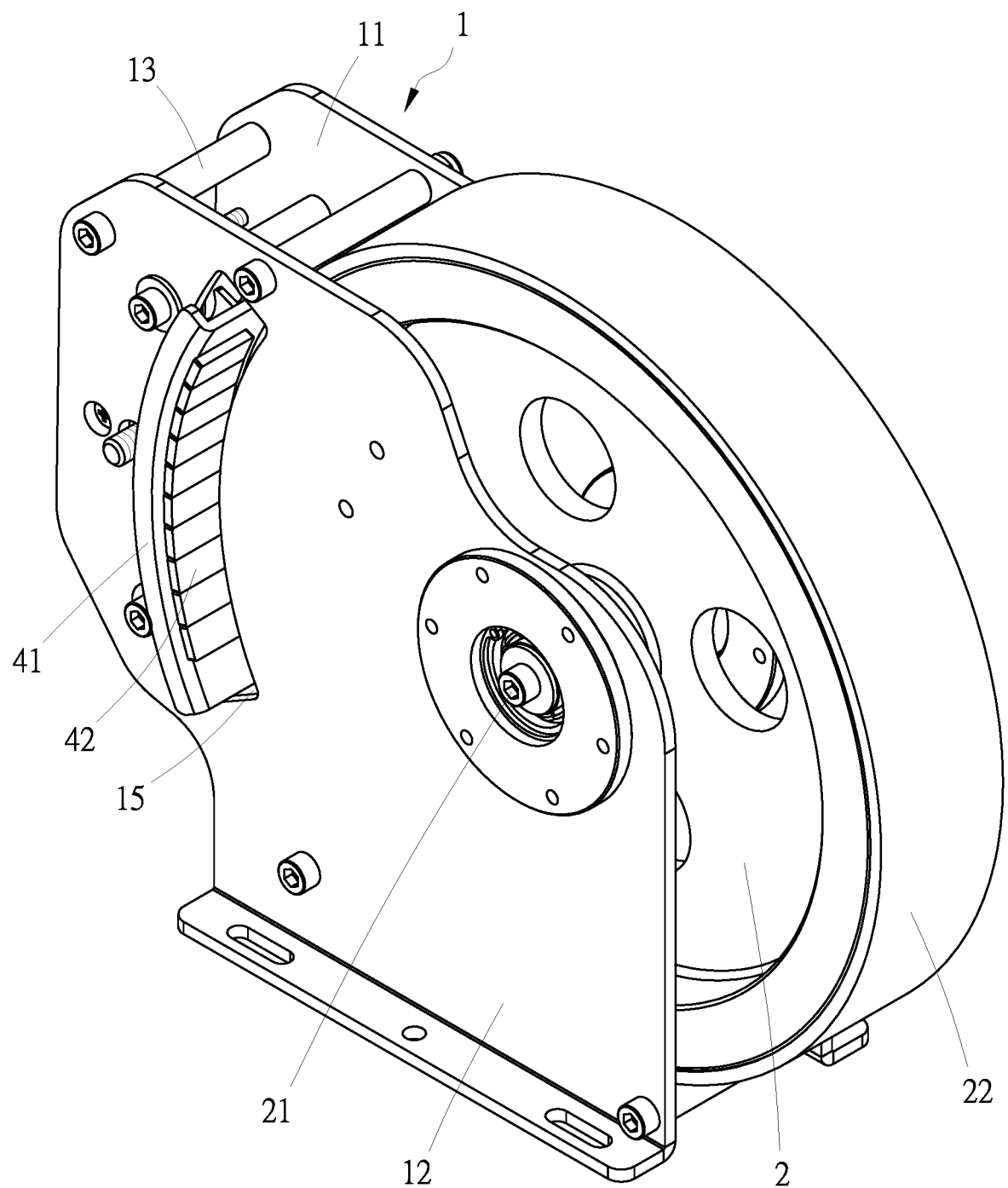
FIG. 3 is a perspective view according to the embodiment of the present invention.

As shown in FIG. 1 and FIG. 2, an embodiment of the present invention comprises a base 1, a flywheel 2, a power unit 3, and a magnetic resistance unit 4. The base 1 includes a first plate 11 and a second plate 12. The first plate 11 and the second plate 12 are arranged oppositely and fixedly connected by a plurality of supporting rods 13. The first plate 11 has a hollow fixing portion 14. The second plate 12 has a corresponding arc-shaped through hole 15 (as shown in FIG. 3).

Figure 4:
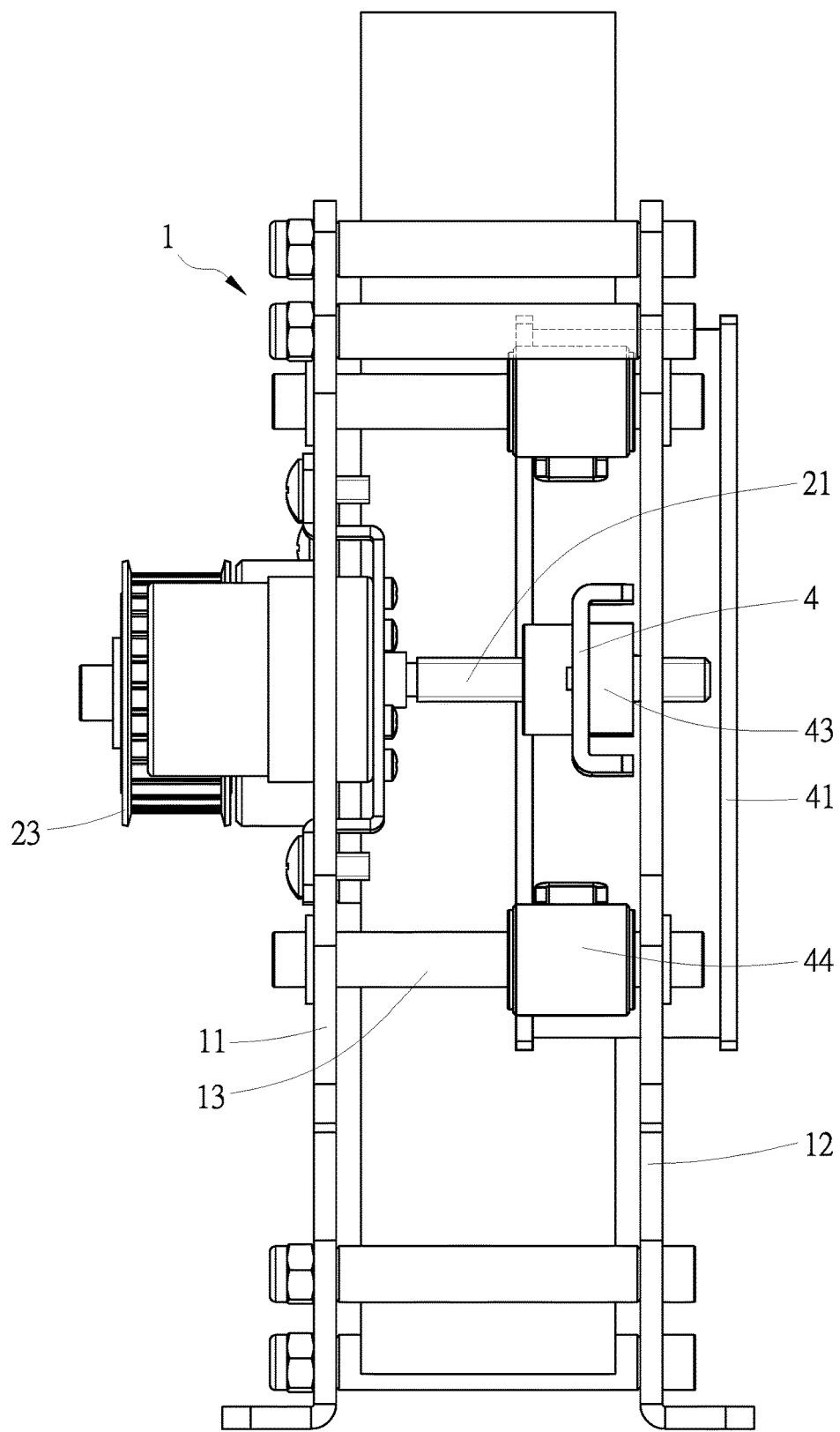
FIG. 4 is a schematic view of the coupling portion moving toward the second plate relative to the non-magnetically sensitive layer according to the embodiment of the present invention.

The flywheel 2 is pivotally connected to the base 1 through a rotating shaft 21 and is located between the first plate 11 and the second plate 12. The rotating shaft 21 defines an axial direction X and is driven by an external force, so that the flywheel 2 rotates about the rotating shaft 21. The flywheel 2 is made of a magnetically sensitive material. In this embodiment, the flywheel 2 is made of cast iron. A non-magnetically sensitive layer 22 is fixedly coupled to the circumference of the flywheel 2. The non-magnetically sensitive layer 22 is made of a non-magnetically sensitive material. In this embodiment, the non-magnetically sensitive layer 22 is made of aluminum. One end of the rotating shaft 21 is connected to a transmission member 23 (as shown in FIG. 4). The transmission member 23 is a sprocket or a pulley.

The power unit 3 is fixed to the fixing portion 14 of the first plate 11 by a fixing seat 31. The power unit 3 is an electric motor. The power unit 3 includes a rotatable lead screw 32 extending along the axial direction X. The lead screw 32 straddles the non-magnetically sensitive layer 22 in the axial direction X.

Figure 5:
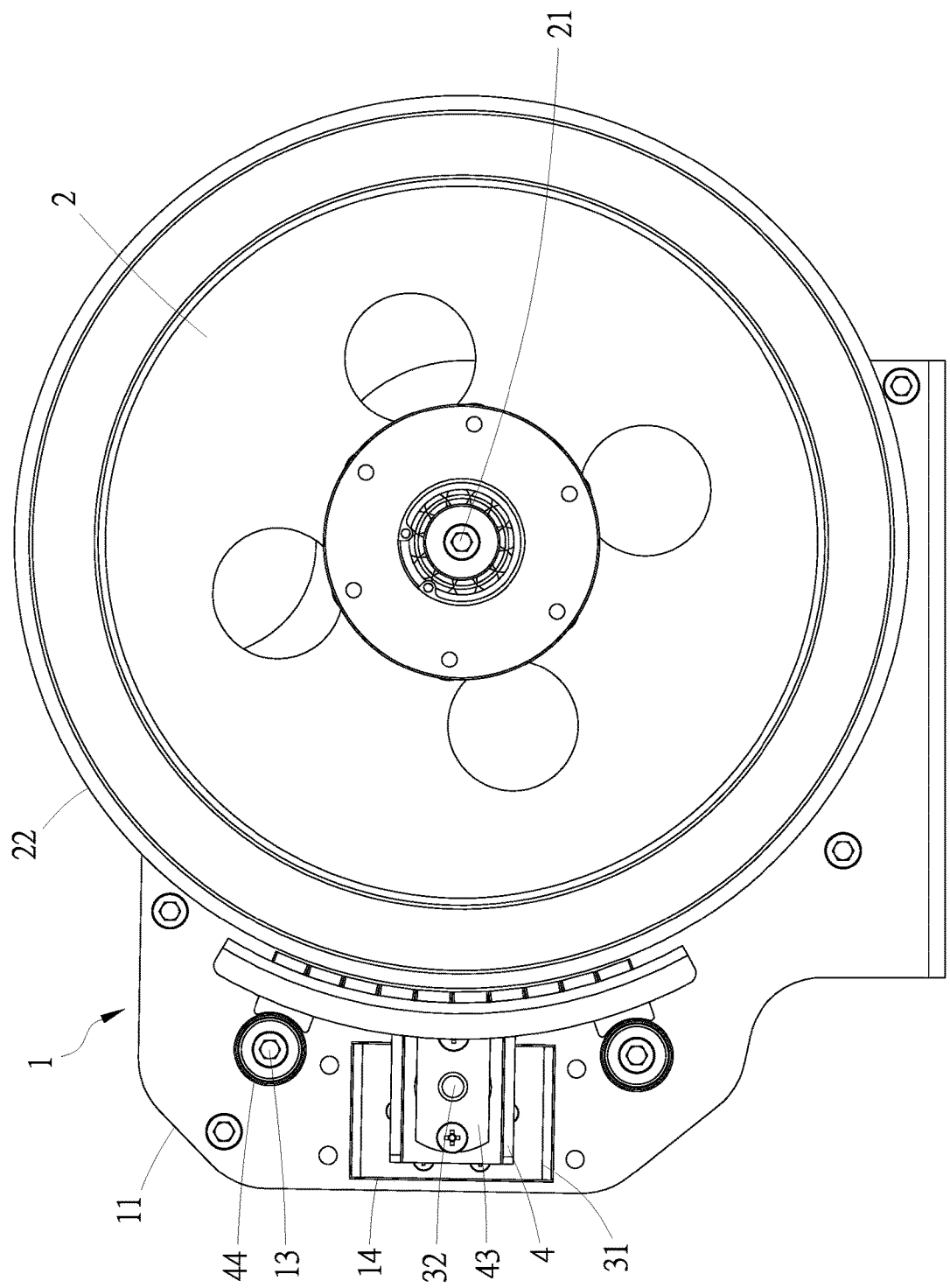
FIG. 5 is a schematic view showing a distance between the magnetic member and the non-magnetically sensitive layer according to the embodiment of the present invention.

The magnetic resistance unit 4 is driven by the power unit 3 to move along the axial direction. The magnetic resistance unit 4 includes a coupling portion 41 (as shown in FIG. 5) corresponding to an arc of the non-magnetically sensitive layer 22. The shape of the cross-section of the coupling portion 41 corresponds to the arc-shaped through hole 15. At least one magnetic member 42 is provided on the coupling portion 41. The magnetic member 42 is a permanent magnet and is kept at a distance from the non-magnetically sensitive layer 22. When the magnetic member 42 and the flywheel 2 overlap each other in the axial direction X, a magnetic field is generated between the magnetic member 42 and the flywheel 2. The magnetic resistance unit 4 includes a moving seat 43 and two sliding blocks 44. The lead screw 32 is threadedly inserted through the moving seat 43. The two supporting rods 13 are inserted through the two sliding blocks 44. When the power unit 3 is energized with a current to rotate the lead screw 32, the moving seat 43 moves along the axial direction X, and the two sliding blocks 44 slide along the axial direction X on the two supporting rods 13 to keep the moving seat 43 moving in a straight line. In this way, the moving seat 43 and the two sliding blocks 44 simultaneously drive the magnetic resistance unit 4 to move along the axial direction X. The magnetic resistance unit 4 and the coupling portion 41 can pass through the through hole 15 when moving, so that the magnetic member 42 on the coupling portion 41 and the non-magnetically sensitive layer 22 can change the overlapping area (as shown in FIG. 4) in the axial direction X, thereby adjusting the magnetic resistance of the flywheel 2.

Figure 9:
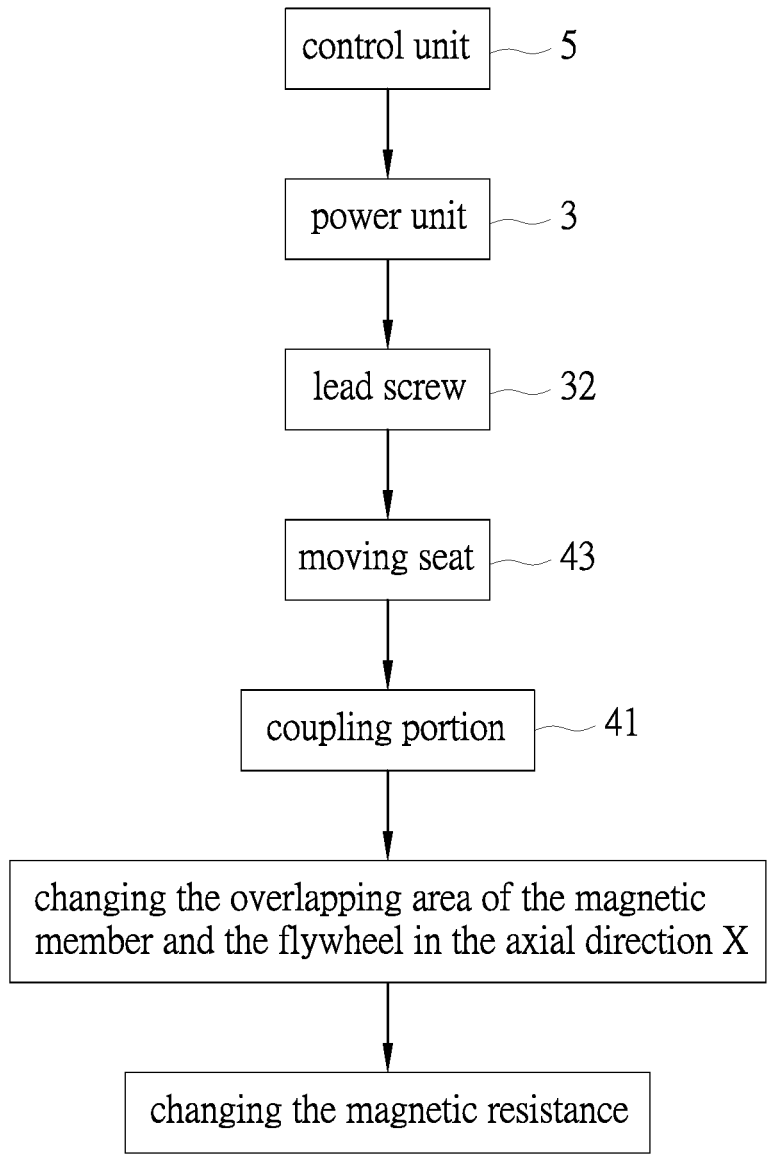
FIG. 9 is a schematic view of the control unit of the embodiment of the present invention to control and change the magnetic resistance.

The control unit 5 is electrically connected to the power unit 3 (as shown in FIG. 9), so as to control the actuation of the power unit 3. The control unit 5 outputs a control command to the power unit 3 for controlling the rotation speed, forward or reverse rotation of the lead screw 32. The control unit 5 has one or more sets of built-in control commands. The control commands may be transmitted to the control unit 5 through an external carrier, such as a cloud, a mobile device, or a flash drive.

Figure 6:
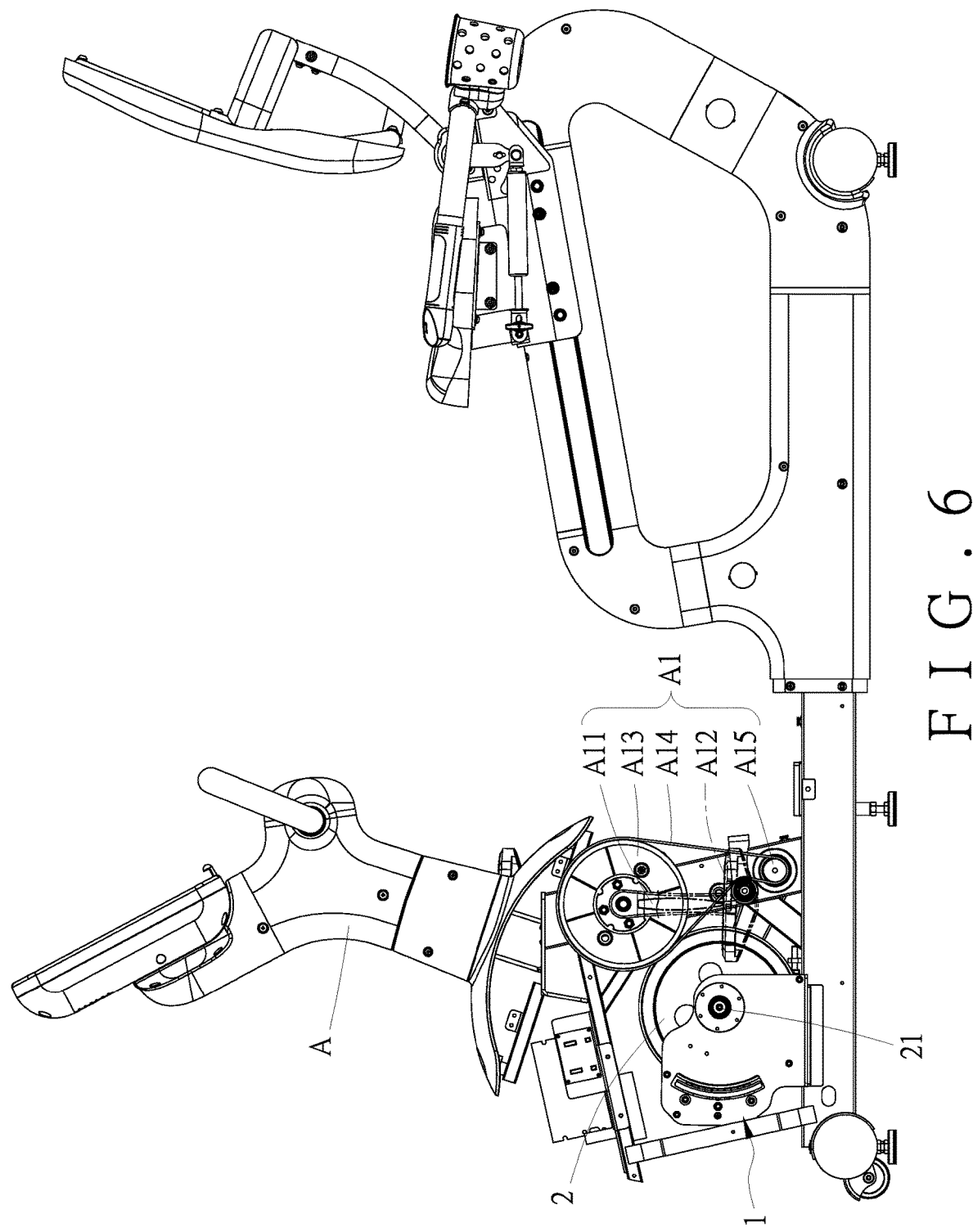
FIG. 6 is a side view according to the embodiment of the present invention applied to the exercise machine.
Figure 7:
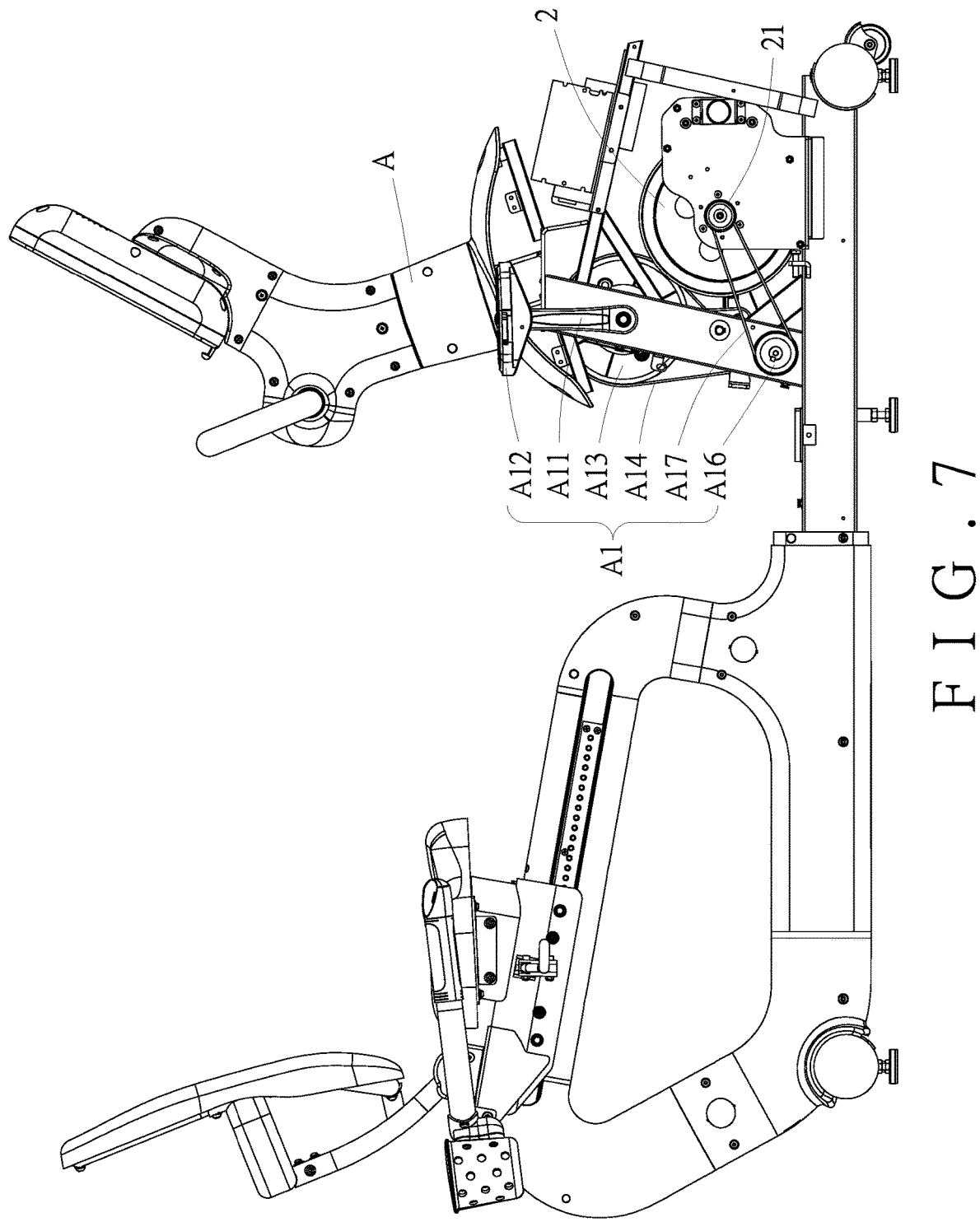
FIG. 7 is another side view according to the embodiment of the present invention applied to the exercise machine.

When in use, as shown in FIG. 6 and FIG. 7, the base 1 is mounted to an exercise machine A. The exercise machine A includes a transmission unit A1. The transmission unit A1 includes a crank A11, a pedal A12, a pulley A13, a first belt A14, a first transmission wheel A15, a second transmission wheel A16, and a second belt A17. One end of the crank A11 is connected to the pedal A12, and the other end of the crank A11 is coaxially fixed with the pulley A13. The first belt A14 connects the pulley A13 and the first transmission wheel A15. The first transmission wheel A15 and the second transmission wheel A16 are coaxially arranged on the exercise machine A. The second belt A17 connects the transmission member 23 that drives the rotating shaft 21 of the flywheel 2. When the user continuously treads the pedal A12 of the transmission unit A1, the pulley A13 is rotated to drive the first belt A14, the first transmission wheel A15, the second transmission wheel A16, the second belt A17, the transmission member 23 and the rotating shaft 21 sequentially, so as to drive the flywheel 2 to rotate.

Figure 8:
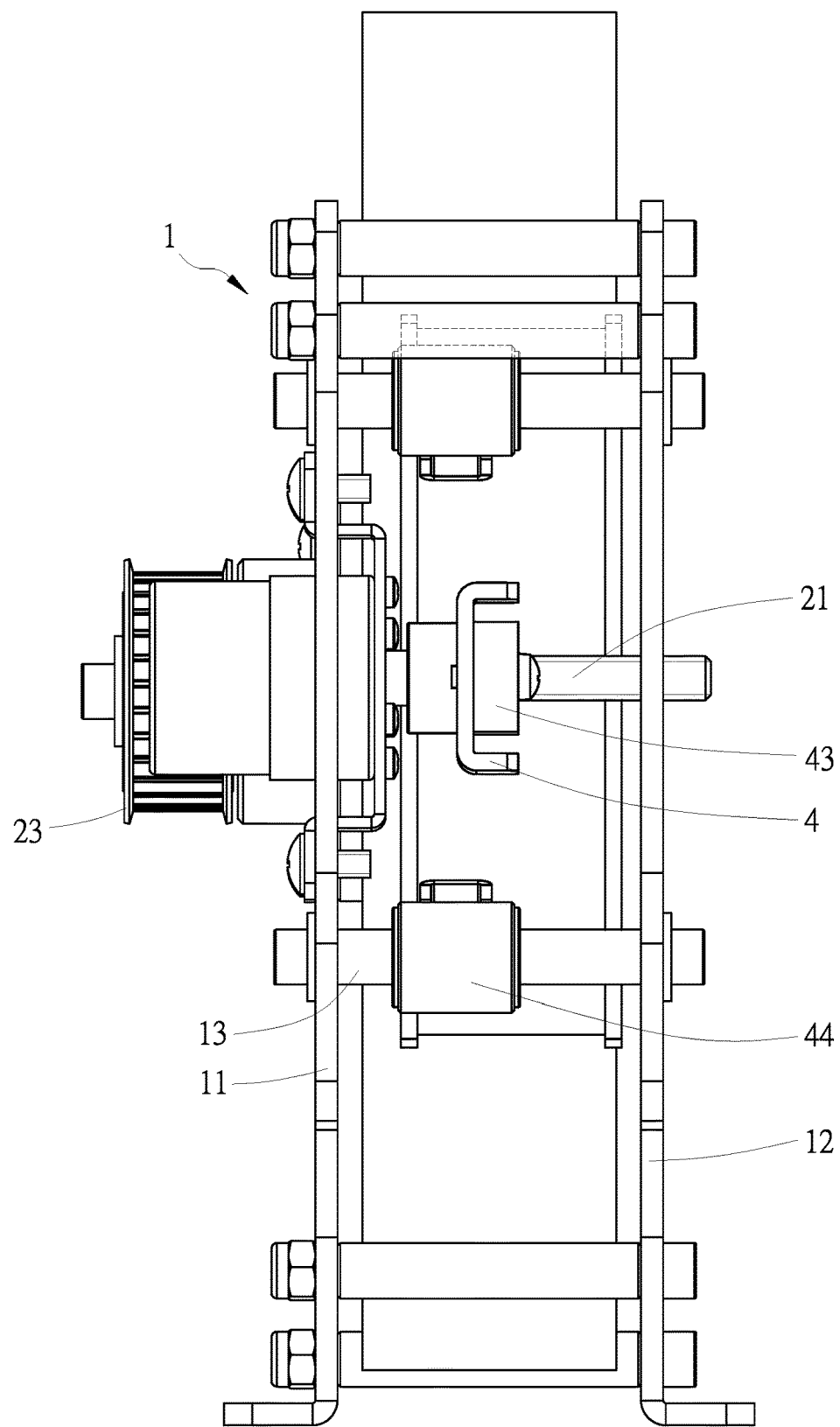
FIG. 8 is a schematic view of the coupling portion moving toward the first plate relative to the non-magnetically sensitive layer according to the embodiment of the present invention.

In use, when it is necessary to change the magnetic resistance of the flywheel 2, the power unit 3 is energized and actuated by applying a current, and the power unit 3 drives the lead screw 32 to rotate. Since the magnetic resistance unit 4 is confined on the two supporting rods 13 by the two sliding blocks 44, the magnetic resistance unit 4 and the moving seat 43 will not rotate along with the lead screw 32. The moving seat 43 only moves along the axial direction X, and the two sliding blocks 44 slide synchronously on the two supporting rods 13. When the moving seat 43 and the two sliding blocks 44 move closer to the first plate 11, as shown in FIG. 5 and FIG. 8, the overlapping area of the magnetic member 42 of the magnetic resistance unit 4 and the non-magnetically sensitive layer 22 in the axial direction X increases, that is, the overlapping area of the magnetic member 42 and the flywheel 2 in the axial direction X increases. At this time, there is a relatively large magnetic resistance between the magnetic member 42 and the flywheel 2 so as to increase the resistance for exercise training. On the contrary, when the moving seat 43 and the two sliding blocks 44 are controlled to move closer to the second plate 12, as shown in FIG. 4 and FIG. 5, the overlapping area of the magnetic member 42 of the magnetic resistance unit 4 and the non-magnetically sensitive layer 22 in the axial direction X is reduced, that is, the overlapping area of the magnetic member 42 and the flywheel 2 in the axial direction X is reduced. At this time, the magnetic resistance between the magnetic member 42 and the flywheel 2 is small, thereby reducing the resistance for exercise training.

Therefore, in the invention only a small current needs to be applied to the power unit 3 to actuate the magnetic resistance unit 4 and change the magnetic resistance in a stepless mode. As to the magnetic resistance unit of the conventional exercise machine, it is necessary to use current to generate a magnetic force through the excitation coil to change the magnetic resistance. Therefore, in the present invention, there will be no loss in the process of generating the magnetic force by the electric current.

FIGS. 10-15 illustrate the relationship between the time and the magnetic resistance. In the figures, the X axis is the time, and the Y axis is the magnetic resistance. In operation, the magnetic resistance may be constant or variable. FIGS. 10-15 show some feasible magnetic resistance modes of the present invention.

1. In a constant magnetic resistance mode, as shown in FIG. 10, in a certain period of time, after the lead screw 32 is adjusted and positioned at a single position, the overlapping area of the magnetic member 42 and the flywheel 2 in the axial direction X is fixed and the magnetic resistance remains constant.

2. In a stepless gradually increasing magnetic resistance mode, as shown in FIG. 11, in a certain period of time, the lead screw 32 continues to rotate, so that the overlapping area of the magnetic member 42 and the flywheel 2 in the axial direction X is gradually increased, and the magnetic resistance is gradually increased in a stepless manner.

3. In a multi-stage gradually increasing magnetic resistance mode, as shown in FIG. 12, in a certain period of time, the lead screw 32 intermittently rotates forward, so that the overlapping area of the magnetic member 42 and the flywheel 2 in the axial direction X is gradually increased in stages. Thus, the magnetic resistance is gradually increased in a multi-stage manner.

4. In a multi-stage gradually decreasing magnetic resistance mode, as shown in FIG. 13, in a certain period of time, the lead screw 32 intermittently rotates in the reverse direction, so that the overlapping area of the magnetic member 42 and the flywheel 2 in the axial direction X is gradually reduced in stages. Thus, the magnetic resistance is gradually reduced in a multi-stage manner.

5. From a stepless gradually increasing magnetic resistance mode to a stepless gradually decreasing magnetic resistance mode, as shown in FIG. 14, in a certain period of time, the lead screw 32 first continues to rotate forward, so that the overlapping area of the magnetic member 42 and the flywheel 2 in the axial direction X is gradually increased; then the lead screw 32 continues to rotate in the reverse direction, the overlapping area of the magnetic member 42 and the flywheel 2 in the axial direction X is gradually reduced, so that the magnetic resistance is first gradually increased in a stepless manner and then gradually reduced in a stepless manner.

6. In a multi-stage hybrid mode, as shown in FIG. 15, in a certain period of time, the lead screw 32 sometimes rotates forward, so that the overlapping area of the magnetic member 42 and the flywheel 2 in the axial direction X becomes larger; the lead screw 32 sometimes rotates in the reverse direction, so that the overlapping area of the magnetic member 42 and the flywheel 2 in the axial direction X becomes smaller, thus, the magnetic resistance is in a hybrid state of gradually increasing magnetic resistance and gradually decreasing magnetic resistance.

Various time/magnetic resistance relationships shown in FIGS. 10-15 are only some of the magnetic resistance modes of the present invention. Other modes, such as a combination of a step magnetic resistance mode and a stepless magnetic resistance mode, or any combination of the above-mentioned modes, etc., are all feasible magnetic resistance modes of the present invention.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An electric magnetic resistance control structure for an exercise machine, comprising:
   a base, said base having first plate and a second plate, the first plate and the second plate are arranged oppositely and fixedly connected by a plurality of supporting rods;
   a flywheel, pivotally connected to the base through a rotating shaft, the rotating shaft defining an axial direction, the flywheel rotating about the rotating shaft, the flywheel being made of a magnetically sensitive material, a non-magnetically sensitive layer being coupled to a circumference of the flywheel;
   a power unit, fixed to the base, said power unit having a rotatable lead screw extending along the axial direction;
   a magnetic resistance unit, driven by the power unit to move along the axial direction, the magnetic resistance unit including a coupling portion corresponding to an arc of the non-magnetically sensitive layer, at least one magnetic member being provided on the coupling portion, the magnetic member being kept at a distance from the non-magnetically sensitive layer to generate a magnetic resistance effect the magnetic resistance unit includes a moving seat and two sliding blocks, the lead screw is threadedly inserted through the moving seat, and the supporting rods are inserted through the two sliding blocks, a control unit, electrically connected to the power unit, so as to control the power unit to actuate;

wherein a current is applied to the power unit to drive the magnetic resistance unit to move along the axial direction, an overlapping area of the magnetic member and the non-magnetically sensitive layer in the axial direction being changeable, so as to adjust a magnetic resistance of the flywheel.

2. The electric magnetic resistance control structure as claimed in claim 1 wherein the second plate has an arc-shaped through hole, and the coupling portion has a cross-section corresponding in shape to the arc-shaped through hole so that the coupling portion can pass through the through hole.

3. The electric magnetic resistance control structure as claimed in claim 1, wherein the power unit is an electric motor configured to drive the lead screw to rotate.

4. The electric magnetic resistance control structure as claimed in claim 1, wherein the lead screw straddles the non-magnetically sensitive layer.

5. The electric magnetic resistance control structure as claimed in claim 1, including an output command signal transmitted from said control unit to the power unit controls a rotation speed, forward or reverse rotation of the lead screw.

6. The electric magnetic resistance control structure as claimed in claim 1, wherein the first plate has a hollow fixing portion, and the power unit is fixed to the fixing portion by a fixing seat.

7. The electric magnetic resistance control structure as claimed in claim 1, wherein one end of the rotating shaft is connected to a transmission member.

8. The electric magnetic resistance control structure as claimed in claim 1, wherein the flywheel is made of cast iron, the non-magnetically sensitive layer is made of aluminum, and the magnetic member is a permanent magnet.

* * * * *